United States Patent

Saito et al.

[11] Patent Number: 5,898,054
[45] Date of Patent: Apr. 27, 1999

[54] PROCESS FOR PRODUCING FLUORINE-CONTAINING ELASTOMER

[75] Inventors: Satoru Saito, Kitaibaraki; Kuniyoshi Kawasaki, Kumamoto; Haruyoshi Tatsu, Hitachi, all of Japan

[73] Assignee: Nippon Mektron, Limited, Tokyo, Japan

[21] Appl. No.: 08/980,236

[22] Filed: Nov. 28, 1997

[30] Foreign Application Priority Data

Nov. 29, 1996 [JP] Japan ................................. 8-333050

[51] Int. Cl.$^6$ ....................................... C08F 2/00
[52] U.S. Cl. .................. 526/206; 526/249; 526/254; 526/255
[58] Field of Search ................... 526/206, 249, 526/254, 255

[56] References Cited

U.S. PATENT DOCUMENTS

| | | | |
|---|---|---|---|
| 3,937,690 | 2/1976 | Weisberger et al. | 526/206 |
| 4,943,622 | 7/1990 | Naraki et al. | |
| 4,983,697 | 1/1991 | Logothetis | 526/206 |
| 5,151,492 | 9/1992 | Abe et al. | |
| 5,231,154 | 7/1993 | Hung | 526/206 |

FOREIGN PATENT DOCUMENTS

| | | | |
|---|---|---|---|
| 0027721 | 4/1981 | European Pat. Off. | 526/206 |
| 0489370 | 6/1992 | European Pat. Off. | 526/206 |
| 0 743 329 A1 | 11/1996 | European Pat. Off. | |
| 60-221409 | 11/1985 | Japan | 526/206 |
| A 1-57126 | 12/1989 | Japan. | |

*Primary Examiner*—Bernard Lipman
*Assistant Examiner*—N. Sarofim
*Attorney, Agent, or Firm*—Barnes & Thornburg

[57] ABSTRACT

A peroxide-vulcanizable fluorine-containing elastomer containing iodines as cross-linking sites, capable of producing vulcanization products having a distinguished heat resistance is produced by polymerization reaction of a fluorinated olefin having 2 to 8 carbon atoms in the presence of a diiodide compound represented by the following general formula:

$$I-R-I$$

where R is a divalent fluorohydrocarbon group, chlorofluorohydrocarbon group or hydrocarbon group, having 2 to 8 carbon atoms, respectively, and 2,2-difluoroiodoethylene.

4 Claims, No Drawings

PROCESS FOR PRODUCING FLUORINE-CONTAINING ELASTOMER

BACKGROUND OF THE INVENTION

1. Field of the Invention

The present invention relates to a process for producing a fluorine-containing elastomer and more particularly to a process for producing a peroxide-vulcanizable, fluorine-containing elastomer copolymerized with a new type of cross-linkable monomer.

2. Description of Related Art

Peroxide vulcanization products of fluorine-containing elastomer have been recently widely used in the field of automobile parts due to their distinguished chemical resistances and mechanical properties, particularly due to the resistance to basic additives. For peroxide vulcanization, fluorine-containing elastomers containing iodines, bromines or both thereof as cross-linking sites are used (JP-B 53-4115, JP-A 1-57126, JP-A 61-55138, JP-A 7-316234, etc.).

However, fluorine-containing elastomers containing iodines as cross-linking sites generally have such an advantage as a high vulcanization speed but such a disadvantage as a poor heat resistance, as compared with fluorine-containing elastomers containing bromines or both bromines and iodines. This tendency is particularly remarkable in fluorine-containing elastomers containing iodines bonded at the copolymer molecule terminals.

SUMMARY OF THE INVENTION

An object of the present invention is to provide a process for producing a peroxide vulcanizable, fluorine-containing elastomer containing iodines as cross-linking sites, which can produce vulcanization products having a distinguished heat resistance.

The process for producing such a fluorine-containing elastomer according to the present invention comprises subjecting a fluorinated olefin having 2 to 8 carbon atoms to polymerization reaction in the presence of a diiodide compound represented by the following general formula:

where R is a divalent fluorohydrocarbon group, chlorofluorohydrocarbon group or hydrocarbon group, having 2 to 8 carbon atoms, respectively, and 2,2-difluoroiodo-ethylene.

DETAILED DESCRIPTION OF THE INVENTION

At least one of fluorinated olefins having 2 to 8 carbon atoms such as vinylidene fluoride, hexafluoropropene, tetrafluoroethylene, chlorotrifluoroethylene, perfluoro(methyl vinyl ether), etc. is used to form fluorine-containing elastomers such as vinylidene fluoride-hexafluoropropene copolymer, vinylidene fluoride-hexafluoropropene-tetrafluoroethylene terpolymer, vinylidene fluoride-tetrafluoroethylene-perfluoro-(methyl vinyl ether) terpolymer, tetrafluoroethylene-perfluoro-(methyl vinyl ether) copolymer, etc. If required, olefins, vinyl compounds, etc. can be further copolymerized.

These fluorine-containing elastomers can be prepared by polymerization reaction of at least one of fluorinated olefins having 2 to 8 carbon atoms in the presence of a diiodide compound represented by the following general formula:

where R has the same meaning as defined above, and 2,2-difluoroiodoethylene.

Diiodide compound for use in the present invention includes, for example, 1,2-diiodoperfluoroethane, 1,3-diiodoperfluoropropane, 1,4-diiodoperfluorobutane, 1,6-diiodoperfluorohexane, 1,8-diiodoperfluorooctane, etc., and 1,4-diiodoperfluorobutane is preferably used. These diiodide compounds can be used in a proportion of about 0.01 to about 0.5% by mole, preferably about 0.03 to about 0.3% by mole, on the basis of the fluorinated olefin monomer. Below about 0.01% by mole, the molecular weight of the resulting polymers will be increased, resulting in deterioration of the processability, whereas above about 0.5% by mole the molecular weight of the resulting copolymers will be too low, resulting not only in deterioration of the processability such as roll kneadability, etc., but also in decrease of the heat resistance of vulcanization products.

2,2-difluoroiodoethylene can be used in a proportion of about 0.01 to about 5% by mole, preferably about 0.03 to about 1% by mole, on the basis of the fluorinated olefin monomer, and also can be used in a proportion of about 1 to about 10 parts by mole, preferably about 1 to about 5 parts by mole, per one part by mole of the diiodide compound. Below about 0.01% by mole on the basis of the fluorinated olefin monomer, no effective amount of cross-linkable groups can be formed, whereas even polymerization using above about 5% by mole of 2,2-difluoroiodoethylene is not economical, because no remarkable improvement will be observable in the heat resistance and the mechanical properties.

Ethyl 2,2-difluoro-2-chloroiodide for use as a starting material of 2,2-difluoroiodoethylene can be obtained by the following reaction of vinylidene fluoride with iodine chloride [J. Org. Chem. 23, 1661 (1958)]:

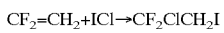

The foregoing reaction can be carried out even under the atmospheric pressure by bubbling a vinylidene fluoride gas into liquid ICl, or can be carried out in a tightly closed reaction system under a pressure. The reaction temperature is about 0° to about 120° C., preferably about 10° to about 70° C., more preferably about 20° to about 50° C. Below about 10° C., the reaction proceeds is at a low rate, whereas above about 70° C., the reaction may occur vigorously or vaporization of the reaction product may occurs.

The resulting reaction has a dark color and thus can be decolorized in an aqueous medium generally under an alkaline condition, using a water-soluble reducing agent. The water-soluble reducing agent includes, for example, water-soluble sulfites such as sodium sulfite, potassium sulfite, ammonium sulfite, calcium sulfite, etc.

Together with these water-soluble sulfites, an alkaline compound is used. The alkaline compound includes, for example, sodium hydroxide, potassium hydroxide, ammonium hydroxide, calcium hydroxide, sodium carbonate, potassium carbonate, ammonium carbonate, disodium hydrogen phosphate, dipotassium hydrogen phosphate, sodium tetraborate, potassium citrate, etc.

The product so decolorized is dried over $P_2O_5$ or $MgSO_4$ or through a molecular sieve, whereby ethyl 2,2-difluoro-2-chloroiodide can be obtained in high yield, e.g. about 90% or higher.

Dehydrochlorination reaction of ethyl 2,2-difluoro-2-chloroiodide is carried out in the presence of a quaternary ammonium salt, a quaternary phosphonium salt or a Crown ether, and an alkali metal hydroxide.

Quaternary salts such as chlorides, bromides, iodides, hydroxides, hydrogensulfates, etc. can be usually used.

Preferable quaternary salts include, for example, tetramethylammonium bromide, tetrabutylammonium bromide, benzyltributylammonium chloride, benzyltriethylammonium chloride, benzyltriethylammonium bromide, tetrabutylammonium hydroxide, tetrabutylammonium hydrogen sulfate, tetrabutylphosphonium bromide, tetrapropylphosphonium bromide, etc. Crown ethers include, for example, 12-Crown-4, 15-Crown-5, 18-Crown-6, dibenzo-18-Crown-6, 21-Crown-7, 24-Crown-8, etc.

These quaternary salts or Crown ethers can be used in a usual catalytic amount for ethyl 2,2-difluoro-2-chloroiodide. The alkali metal hydroxide as a dehydrochlorinating agent can be used in an amount of at least one equivalent mole in the form of an aqueous solution on the basis of ethyl 2,2-difluoro-2-chloroiodide.

The dehydrochlorination reaction using these catalysts can be carried out at a temperature of about 0° to about 150° C., preferably about 50° to about 100° C., more preferably about 90° to about 100° C., Below about 50° C., the reaction proceeds at a considerably low rate, whereas above about 100° C. the yield is lowered.

It is preferable to conduct the reaction in the presence of a polar solvent. The polar solvent includes, for example, acetone, methylethylketone, dioxane, tetrahydrofuran, methanol, ethanol, acetic acid, etc. Dioxane is preferably used. Reaction in the presence of a less polor solvent such as saturated hydrocarbons can produce the desired product in good yield. In that case, an aqueous layer (alkali layer) and an organic layer are separated, resulting in a two layer reaction system. Preferable solvents for this purpose are those having a higher boiling point than the reaction temperature, for example, decalin, etc.

With progress of reaction, 2,2-difluoroiodoethylene having a boiling point of 40° to 42° C. is formed and thus collected in an external trap cooled to −10° C. Desired pure product can be obtained by distillation of the trap contents.

Copolymerization reaction can be carried out by any polymerization method, for example, by emulsion polymerization, suspension polymerization, solution polymerization, bulk polymerization, etc. From the viewpoints of higher degree of polymerization and better economy, an emulsion polymerization is preferable. Emulsion polymerization reaction can be carried out usually at a temperature of about 0° to about 100° C., preferably about 50° to about 80° C. under a pressure of about 10 MPa or less, preferably about 0 to 5 MPa, using a water-soluble inorganic peroxide such as ammonium persulfate, etc. or a redox system thereof with a reducing agent as a catalyst, and ammonium perfluorooctanoate, ammonium perfluoroheptanoate, ammonium perfluorononanoate, ammonium perfluorooxyalkylcarboxylate, etc. or a mixture thereof, preferably ammonium perfluorooctanoate as an emulsifying agent. To adjust pH of the polymerization system, an electrolyte compound having a buffer function such as $Na_2HPO_4$, $NaH_2PO_4$, $KH_2PO_4$, etc. or NaOH, etc. may be used at the same time.

The fluorine-containing elastomer so obtained has an intrinsic viscosity $\eta$ sp/c (35° C. in methylethylketone) of about 0.1 to about 3 dl/g, preferably about 0.5 to 2 dl/g, and can be vulcanized by so far well known various vulcanization methods, for example, peroxide vulcanization method, polyamine vulcanization method, polyol vulcanization method, etc., and can be cross-linked preferably by an organic peroxide.

Organic peroxides for use in the vulcanization include, for example, 2,5-dimethyl-2,5-bis(t-butylperoxy)hexane, 2,5-dimethyl-2,5-bis(t-butylperoxy)hexine-3, benzoyl peroxide, bis (2,4-dichlorobenzoyl)peroxide, dicumyl peroxide, di-t-butyl peroxide, t-butyl cumyl peroxide, t-butyl peroxybenzene, 1,1-bis(t-butylperoxy)-3,5,5-trimethylcyclohexane, 2,5-dimethylhexane-2,5-dihydroxyperoxide, α,α'-bis(t-butylperoxy)-p-diisopropylbenzene, 2,5-dimethyl-2,5-di(benzoylperoxy)hexane, t-butyl-peroxyisopropyl carbonate, etc.

In the peroxide vulcanization method using these organic peroxides, a polyfunctional unsaturated compound is usually used as a cocross-linking agent at the same time. The polyfunctional unsaturated compound includes, for example, tri(meta)allyl isocyanurate, tri(meta)allyl cyanurate, triallyl trimellitate, N,N'-m-phenylene bismaleimide, diallyl phthalate, tris(diallylamine)-s-triazine, triallyl phosphite, 1,2-polybutadiene, ethyleneglycol diacrylate, diethyleneglycol diacrylate, etc.

Proportions of the foregoing components compounded to the peroxide vulcanization systems are as follows: generally about 0.1 to about 5 parts by weight, preferably about 0.5 to about 3 parts by weight, of an organic peroxide, and about 0.5 to about 10 parts by weight, preferably about 0.5 to about 5 parts by weight, of a cocross-linking agent can be used per 100 parts by weight of the fluorine-containing elastomer.

A composition containing the foregoing components can appropriately contain an inorganic filler such as carbon black, silica, etc.; an acid acceptor such as oxides or hydroxides of divalent metals (e.g. ZnO, CaO, $Ca(OH)_2$, MgO, PbO, etc.) or synthetic hydrotalcite, etc.; a processing aid such as polyethyleneglycol monomethyl ether, Crown ether, etc.; a plasticizer; a stabilizer; pigments; and other necessary additives.

The fluorine-containing elastomer obtained according to the present invention can be blended and cocross-linked with other peroxide-cross-linkable materials such as silicone oil, silicone rubber, fluorosilicone rubber, fluorophosphazene rubber, ethylene-vinyl acetate copolymer, ethylene-acrylate copolymer, ethylene-propylene(-diene) copolymerized rubber, acrylonitrile-butadiene copolymerized rubber, acrylate rubber, etc.

The composition can be prepared by kneading, using a double roll, kneader, a Banbury mixer, etc., and can be cross-linked by heating at about 140° to 220° C. for about 2 to about 30 minutes. To improve the mechanical characteristics according to uses, secondary vulcanization may be carried out in air at a temperature of about 180° to about 230° C. for a few hours.

The present fluorine-containing elastomer can give vulcanization products having a good heat resistance by vulcanization using an organic peroxide. The present fluorine-containing elastomer can give a cross-linkable composition having distinguished flow characteristics and molding process ability.

PREFERRED EMBODIMENTS OF THE INVENTION

The present invention will be described in detail below, referring to Reference Examples, Example and Comparative Examples.

REFERENCE EXAMPLE 1

(1) 162 g (1 mole) of a liquid ICl at a temperature of 28° to 29° C. was charged into a reaction vessel, and a vinylidene fluoride gas was bubbled therein. The temperature was immediately lowered to 22° to 24° C. Vinylidene fluoride bubbling was continued until no more consumption of vinylidene fluoride took place, while keeping the temperature at 22° to 24° C. After the end of reaction, the resulting dark reaction mixture was washed with an aqueous solution containing 5 g each of $Na_2SO_3$ and $Na_2CO_3$ in 100 ml of water and then with water, and dried over $MgSO_4$, whereby 209 g of ethyl 2,2-difluoro-2-chloroiodide having a purity of 98% or more (determined by gas chromatography) was obtained (yield: 92.5%).

(2) 33.9 g (0.15 moles) of ethyl 2,2-difluoro-2-chloroiodide obtained in above-mentioned (1) was added to 28 ml of an aqueous 60 wt. % potassium hydroxide solution containing 0.7 g (2.1 m-mole) of tetrabutylammonium bromide as dissolved therein at 70° C., and the mixture was refluxed with heating and stirring, while distilling off fractions having a boiling point of 80° to 90° C. or higher at the same time. Reaction was accompanied by generation of a gas. It was found from mass spectral date as given below that the gas was vinylidene fluoride:

| MS(m/z, %): | $64(M)^+$ | 100 |
| --- | --- | --- |
| | $63(M—H)^+$ | 15 |
| | $45(M—F)^+$ | 50 |
| | $44(M—HF)^+$ | 25 |
| | $33(CHF_2)^+$ | 30 |
| | $31(CF)^+$ | 32 |

Trap contents collected in a trap at −1° C. were dried over $MgSO_4$ and then redistilled, whereby 7. 6 g of 2,2-difluoroiodo-ethylene having a boiling point of 40° to 42° C. and 1.7 g of the starting material having a boiling point of 920° to 94° C. (ethyl 2,2-difluoro-2-chloroiodide) were obtained as discrete fractions, respectively. Yield of the desired product as a remainder of subtraction of the starting material was 28%.

Elemental analysis ($C_2HF_2I$): Found: C:12.74%, H:0.58%, F:19.98%; Calculated: C:12.63%, H:0.53%, F:20.00%

NMR spectrum (internal standard; tetramethylsilane): 4.3d;

$J_{H-F}$(trans)=24 Hz;

$^{19}$F-NMR (internal standard; $CF_3COOH$):

0.5dd(F-trans);

−4.5d(F-cis); $J_{F-F}$=28 Hz;

| MS(m/z,%): | $190(M)^+$ | 100 |
| --- | --- | --- |
| | $171(M—F)^+$ | 5 |
| | $159(CHFI)^+$ | 1 |
| | $146(JF)^+$ | 2 |
| | $140(CHJ)^+$ | 6 |
| | $127(J)^+$ | 20 |
| | $63(C_2HF_2)^+$ | 25 |
| | $44(C_2HF)^+$ | 4 |
| | $31(CF)^+$ | 7 |

REFERENCE EXAMPLE 2

A mixture of 22.6 g (0.1 mole) of ethyl 2,2-difluoro-2-chloroiodide obtained in (1) of Reference Example 1, 0.5 g (1.9 m-moles) of 18-Crown-6 and 30 ml of an aqueous 60 wt. % potassium hydroxide solution was gently distilled under reflux, while collecting volatile matters in a trap cooled at −10° C. Trap contents (substantially pure desired product containing a trace of the starting material) was dried over $MgSO_4$ and then redistilled, whereby 7.4 g of 2,2-difluoroiodoethylene having a boiling point of 40° to 42° C. was obtained (yield: 39%).

REFERENCE EXAMPLE 3

A mixture of 50 g (0.22 moles) of ethyl 2,2-difluoro-2-chloroiodide obtained in (1) of Reference Example 1, an aqueous potassium hydroxide solution containing 100 g of potassium hydroxide in 60 ml of water, 25 ml of dioxane and 0.75 g (2.8 m-moles) of 18-Crown-6 was stirred at a temperature of 80° to 90° C., while collecting volatile matters in a trap cooled to −10° C. An organic layer was separated from the trap contents and dried over $MgSO_4$, whereby 43 g of a mixture of desired product/starting material/dioxane in a composition ratio of 44.6:46.5:8.9 by gas-liquid chromatography was obtained. The mixture was redistilled, whereby 18.1 g of 2,2-difluoroiodoethylene having a boiling point of 40° to 42° C. was obtained. Yield of the desired product as a remainder of subtraction of the starting material was 72%.

REFERENCE EXAMPLE 4

A mixture of 25 g (0.11 mole) of ethyl 2,2-difluoro-2-chloroiodide obtained in (1) of Reference Example 1, 32 g of an aqueous 56 wt. % potassium hydroxide solution and 40 ml of decalin was heated to 80° to 90° C. with vigorous stirring. Volatile matters distilling off with progress of reaction were recovered in a trap cooled to −30° C., whereby 17 g of crude product was obtained. A chromatographic analysis of the crude product revealed that the content of 2,2-difluoroiodoethylene was 88%.

EXAMPLE 30 g of ammonium perfluorooctanoate, 10 g of disodium hydrogen phosphate and 5 liters of water were charged into a stainless steel autoclave having a 10 Liters capacity, and the interior of the autoclave was flushed with a nitrogen gas and degassified. Then, the following compounds were charged therein:

| Vinylidene fluoride [VdF] | 530 g |
| --- | --- |
| Hexafluoropropene [HFP] | 940 g |
| Tetrafluoroethylene [TFE] | 210 g |
| 2,2-difluoroiodoethylene | 10.2 g |

Then, the autoclave was heated to a reactor inside temperature of 70° C. with stirring.

Then, 3.0 g of ammonium persulfate, 13.5 g of 1,4-diiodoperfluorobutane and 10.2 g of 1-iodo-2,2-difluoroethylene were charged into the autoclave under pressure to initiate polymerization reaction. Polymerization reaction was continued for about 6 hours, while additionally charging 1.9 kg of a gas mixture of VdF/HFE/TFE in a molar ratio of 61.9/21.8/16.3 to keep the polymerization pressure at 33 to 34 kg/cm² gage.

After the end of polymerization reaction, the resulting aqueous latex was coagulated by an aqueous calcium chloride solution, followed by washing with water and drying, whereby 2.64 kg of a copolymer having the following properties was obtained:

Solution viscosity (35° C., methylethylketone): 0.57 dl/g

Mooney viscosity $ML_{1+10}$ (121° C.): 21.7

Copolymer composition (in molar ratio):VdF/HFP/TFE=64.6/19.3/16.1

Iodine content: 0.35 wt. %

To 100 parts by weight of the resulting copolymer were added the following compounds:

| | |
|---|---|
| MT carbon black | 35 parts by weight |
| Triallyl isocyanurate (TAIC M-60, trademark of a product made by Nippon Kasei Chemical Co., Ltd, Japan) | 4 parts by weight |
| Organic peroxide (Luperco 101XL, trademark of Yoshitomi-Atchem Co., Ltd, Japan) | 3 parts by weight |
| Zinc oxide | 5 parts by weight |

The mixture was kneaded through two rolls mill, and the resulting kneaded product was press-vulcanized at 170° C. for 10 minutes and then vulcanization-molded into a sheet and an O-ring (P-24).

COMPARATIVE EXAMPLE 1

Copolymerization reaction was carried out in the same manner as in Example, except that the amount of 1,4-diiodoperfluorobutane was changed to 18.0 g and no 2,2-difluoroiodoethylene was used, whereby 2.58 kg of a copolymer having the following properties was obtained:

Solution viscosity (35° C., methylethylketone): 1.09 dl/g

Mooney viscosity $ML_{1+10}$ (121° C.): 58.0 pts

Copolymer composition (in molar ratio): VdF/HFP/TFE=64.7/18.5/16.8
Iodine content: 0.4 wt. %

The resulting copolymer was vulcanized and subjected to determination in the same manner as in Example.

COMPARATIVE EXAMPLE 2

Copolymerization reaction was carried out in the same manner as in Example, except that the amount of 1,4-diiodoperfluorobutane was changed to 27.0 g and no 2,2-difluoroiodoethylene was used, whereby 2.8 kg of a coplymer having the following properties was obtained:

Solution viscosity (35° C., methylethylketone): 0.53 dl/g

Mooney viscosity $ML_{1+10}$ (121° C.): 11.8 pts

Copolymer composition (in molar ratio): VdF/HFP/TFE=65.3/18.5/16.2
Iodine content: 0.5 wt. %

The resulting copolymer was vulcanized and subjected to determination in the same manner as in Example.

Results of determinations in Example and Comparative Examples 1 and 2 are shown in the following Table:

TABLE

| Determinations | Example | Comp. Ex. 1 | Comp. Ex. 2 |
|---|---|---|---|
| [Mooney viscosity, Scorch] | | | |
| $ML_{1+4}$ (pts) | 29 | 72 | 17 |
| MLmin (pts) | 26 | 68 | 14 |
| $t_5$ (min.) | 13.1 | 11.1 | 26 |
| [Original physical properties] | | | |
| Hardness | 72 | 72 | 69 |
| 100% modulus (MPa) | 7.8 | 4.3 | 4.0 |
| Tensile strength (MPa) | 23.9 | 21.2 | 21.9 |
| Elongation (%) | 220 | 320 | 270 |
| [Heat aging resistance] | | | |
| Hardness change (pts) | −1 | −1 | −2 |
| 100% modulus change (%) | −30 | −38 | −35 |
| Tensile strength change (%) | −18 | −38 | −23 |
| Elongation change (%) | +26 | +53 | +30 |
| [Compression set; (%)] | 25 | 33 | 28 |
| [Flow characteristics] | | | |
| Q value (cm³/sec) | $2.0 \times 10^{-3}$ | $0.9 \times 10^{-3}$ | $1.5 \times 10^{-3}$ |

Mooney viscosity, Scorch: according to JIS K-6300
Hardness: according to DIN 53 505
100% modulus, tensile strength, and elongation: according to DIN 53 504
Compression set: according to DIN 53 517
Flow characteristics: Q value at a temperature of 150° C. and a load of 10 kg/cm², using a koka type, flow tester having a die, 1 mm in diameter and 1 mm in length.

What is claimed is:

1. A process for producing a peroxide-curable, fluorine-containing elastomer, which comprises subjecting a fluorinated olefin having 2 to 8 carbon atoms to polymerization reaction in the presence of a diiodide compound represented by the following general formula:

I—R—I where R is a divalent fluorohydrocarbon group, chlorofluorohydrocarbon group or hydrocarbon group, having 2 to 8 carbon atoms, respectively, and 2,2-difluoroiodoethylene.

2. A process according to claim 1, where the fluorohydrocarbon group is a perfluorinated hydrocarbon group having 2 to 8 carbon atoms.

3. A process according to claim 1, where the diiodide compound is used in a proportion of about 0.01 to about 0.5% by mole on the basis of the fluorinated olefin.

4. A process according to claim 1, wherein the 2,2-difluoroiodoethylene is used in a proportion of about 0.03 to about 1% by mole on the basis of the fluorinated olefin.

* * * * *